(12) United States Patent
Weaver et al.

(10) Patent No.: US 10,899,464 B2
(45) Date of Patent: Jan. 26, 2021

(54) MOVEABLE AIRCRAFT COWL AND BYPASS SECTION

(71) Applicant: PRATT & WHITNEY CANADA CORP., Longueuil (CA)

(72) Inventors: Paul Weaver, Chateauguay (CA); Scott Smith, St-Lambert (CA); Mark Huzzard Cunningham, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 337 days.

(21) Appl. No.: 15/920,571

(22) Filed: Mar. 14, 2018

(65) Prior Publication Data

US 2019/0283893 A1   Sep. 19, 2019

(51) Int. Cl.
| | | |
|---|---|---|
| *B64D 29/08* | (2006.01) | |
| *B64D 27/14* | (2006.01) | |
| *B64D 33/04* | (2006.01) | |
| *B64D 33/02* | (2006.01) | |
| *B64D 29/06* | (2006.01) | |
| *F02C 7/04* | (2006.01) | |
| *F02C 7/14* | (2006.01) | |

(52) U.S. Cl.
CPC ............ *B64D 29/08* (2013.01); *B64D 27/14* (2013.01); *B64D 29/06* (2013.01); *B64D 33/02* (2013.01); *B64D 33/04* (2013.01); *F02C 7/04* (2013.01); *F02C 7/14* (2013.01); *B64D 2033/0253* (2013.01); *F05D 2220/329* (2013.01); *F05D 2240/12* (2013.01); *F05D 2240/14* (2013.01); *F05D 2260/606* (2013.01)

(58) Field of Classification Search
CPC ........ B64D 29/08; B64D 29/06; B64D 33/02; B64D 33/04; B64D 41/00; B64D 41/007; B64D 2041/002; F02C 7/04
See application file for complete search history.

(56) References Cited

U.S. PATENT DOCUMENTS

| | | | | |
|---|---|---|---|---|
| 1,623,099 A | | 4/1927 | Dieter | |
| 4,291,530 A | * | 9/1981 | Ballard | .................. B64D 33/04 428/116 |
| 2002/0100837 A1 | * | 8/2002 | Hatrick | ..................... F02K 1/72 244/110 B |
| 2008/0245062 A1 | * | 10/2008 | Dionne | .................. B64D 41/00 60/320 |

(Continued)

*Primary Examiner* — Philip J Bonzell
*Assistant Examiner* — Tye William Abell
(74) *Attorney, Agent, or Firm* — Norton Rose Fulbright Canada LLP (57) ABSTRACT

The aircraft can have an aircraft engine and a cowl, the engine having an engine part disposed within the cowl, the cowl having a cowl section movable relative to a remainder of the cowl, the engine further having a gas path duct internal to the cowl with a first portion and a cooperating second portion, the second portion mounted to the cowl section, the cowl section moveable between a first position in which the first portion and the second portion are in fluid flow communication with one another and a second position in which the cowl section and the second portion are moved away from the first portion, wherein in the first position at least the second portion obstructs external access to the engine part and in the second position at least the second portion is displaced to permit external access to the engine part.

17 Claims, 6 Drawing Sheets

(56) References Cited

U.S. PATENT DOCUMENTS

2010/0001123 A1* 1/2010 Hillereau ................. F02K 1/72
          244/54
2016/0075439 A1* 3/2016 Mores ..................... F02C 7/055
          244/53 B

* cited by examiner

MOVEABLE AIRCRAFT COWL AND BYPASS SECTION

TECHNICAL FIELD

The application related generally to gas turbine engines and, more particularly to an aircraft having a moving cowl section allowing access to a gas turbine engine.

BACKGROUND OF THE ART

Gas turbine engines are typically housed or covered by components referred to as cowls in aircraft engines. While gas turbine engine and cowl arrangements were satisfactory to a certain degree, there remained room for improvement. In particular, there remained a need to provide a better access to the gas turbine engine, or more specifically, to one or more parts thereof, via the cowl, during operations such as maintenance.

SUMMARY

In one aspect, there is provided an aircraft comprising an aircraft engine and a cowl, the engine having an engine part disposed within the cowl, the cowl having a cowl section movable relative to a remainder of the cowl, the engine further having a gas path duct internal to the cowl with a first portion and a cooperating second portion, the second portion mounted to the cowl section, the cowl section moveable between a first position in which the first portion and the second portion are in fluid flow communication with one another and a second position in which the cowl section and the second portion are moved away from the first portion, wherein in the first position at least the second portion obstructs external access to the engine part and in the second position at least the second portion is displaced to permit external access to the engine part.

In another aspect, there is provided an aircraft comprising cowl having, a cowl section movably mounted to a remainder of the cowl between an first position and a second position, and a gas path duct internal to the cowl with a first portion and a cooperating second portion, the second portion mounted to the cowl section, the cowl section moveable between a first position in which the first portion and the second portion are in fluid flow communication with one another and a second position in which the cowl section and the second portion are moved away from the first portion.

In another aspect, there is provided a cowl section for an aircraft, the cowl section having an attachment for movably mounting the cowl section to a remainder of a cowl of the aircraft, the cowl section having a duct portion secured thereto.

In another aspect, there is provided an aircraft comprising a frame, a gas turbine engine having an engine part and being secured to the frame, a cowl section movably mounted to the frame between an operating configuration in which the cowl section covers the engine part, and a maintenance configuration in which the cowl is moved away from, and provides access to the engine part, and a duct, the duct having a first portion made integral to the frame, and a second portion made integral to the cowl section, the first portion and second portion being in fluid flow communication when the cowl section is in the operating configuration.

In another aspect, there is provided an aircraft comprising a frame, a cowl section movably mounted to the frame between an operating configuration and a maintenance configuration, and a duct, the duct having a first portion made integral to the frame, and a second portion made integral to the cowl section, the first portion and second portion being in fluid flow communication when the cowl section is in the operating configuration.

In a further aspect, there is provided a cowl section for an aircraft, the cowl section having an attachment for movably mounting the cowl section to a frame of the aircraft, the cowl section having a duct portion secured thereto.

DESCRIPTION OF THE DRAWINGS

Reference is now made to the accompanying figures in which.

DETAILED DESCRIPTION

Figure 1:
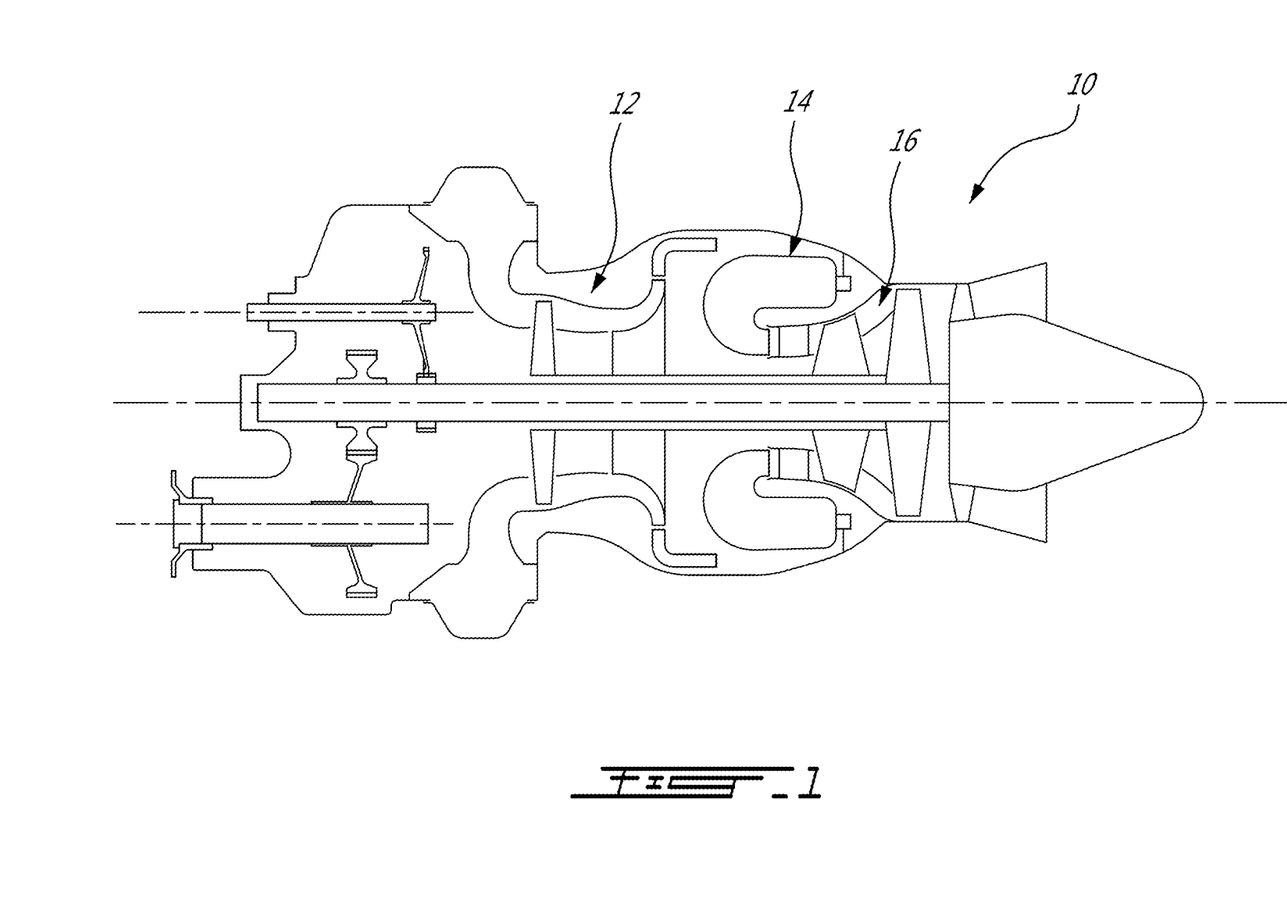
FIG. 1 is a schematic cross-sectional view of a gas turbine engine.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

Figure 2:
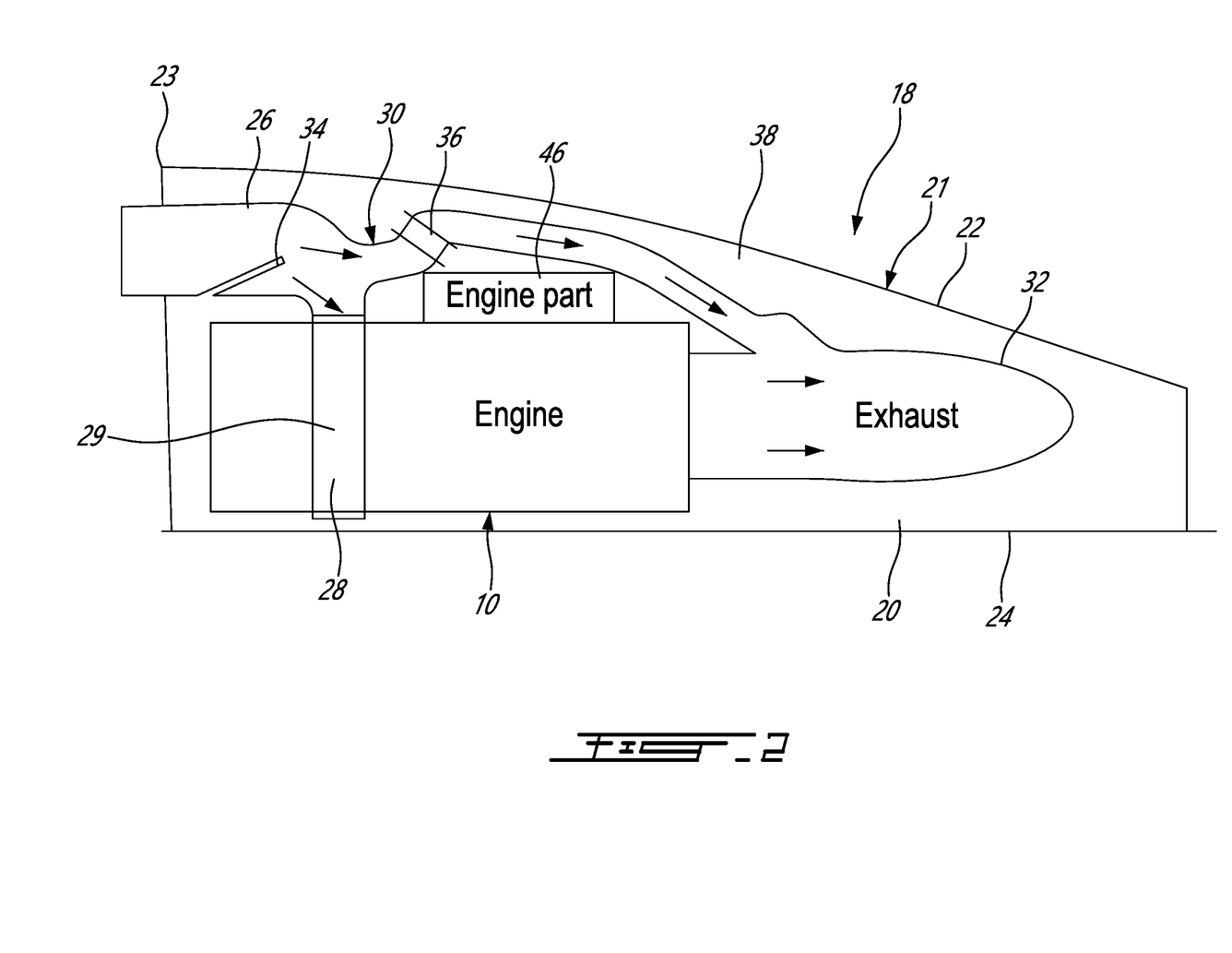
FIG. 2 is a schematic cross-sectional view, taken along a vertical and longitudinal plane, of a portion of an aircraft having a gas turbine engine, with a cowl in an operating configuration.

FIG. 2 shows a first example of an aircraft 18. In this example, more specifically, an upper nacelle section of a helicopter is shown. The aircraft 18 has a frame 20, and an engine 10 is secured to the frame. In this case, the engine 10 is a turboshaft engine. The aircraft also has a cowl 21, and the engine 10 is within the cowl 21. The cowl 21 includes a cowl section 22 which is moveable relative to a remainder 23 of the cowl. The cowl section 22 can also be said to be moveably connected to the frame 20 whereas the remainder of the cowl is secured (made integral) to the frame 20. In this embodiment, the cowl section 22 is connected to the frame 20 via a sliding connection 24. The sliding connection 24 can have rails on the frame 20, and wheels mounted to the cowl 22 and matingly engaged with the rails, for instance, or any other suitable arrangement. In FIG. 2, the aircraft 18 is shown with the cowl 21 in an operation configuration, in which the cowl section 22 is in a first position. Indeed, during operation of the aircraft, the cowl section 22 covers the engine. An inlet duct 26 is secured to the frame 20, and conveys air to the engine's inlet 28. In this specific embodiment, the engine's inlet 28 is a quasi-scroll inlet 29. The quasi-scroll inlet 29 includes a duct 29a (FIG. 4) that extends circumferentially around a portion of the engine 10. The duct 29a communicates with the engine 10. More specifically, the duct 29*a* extends circumferentially around a portion of the compressor 12 of the engine 10. The duct 29*a* communicates with the compressor 12 for feeding air to the compressor 12. A bypass duct 30 branches off from the inlet duct 26 and reconnects with the main flow at an exhaust duct 32. A deflector 34, more specifically a deflector screen, is positioned upstream of the engine's inlet 28, and serves to deflect particulate debris and the like to the bypass duct 30, protecting the engine's core. In this specific embodiment, an oil cooler 36 is positioned in the bypass duct 30, where bypass air flow cools the oil circulating across the oil cooler 36. It will be noted that the bypass duct extends between the engine 10 and the outer shell of the cowl section 22 in the operating configuration.

Figure 3:
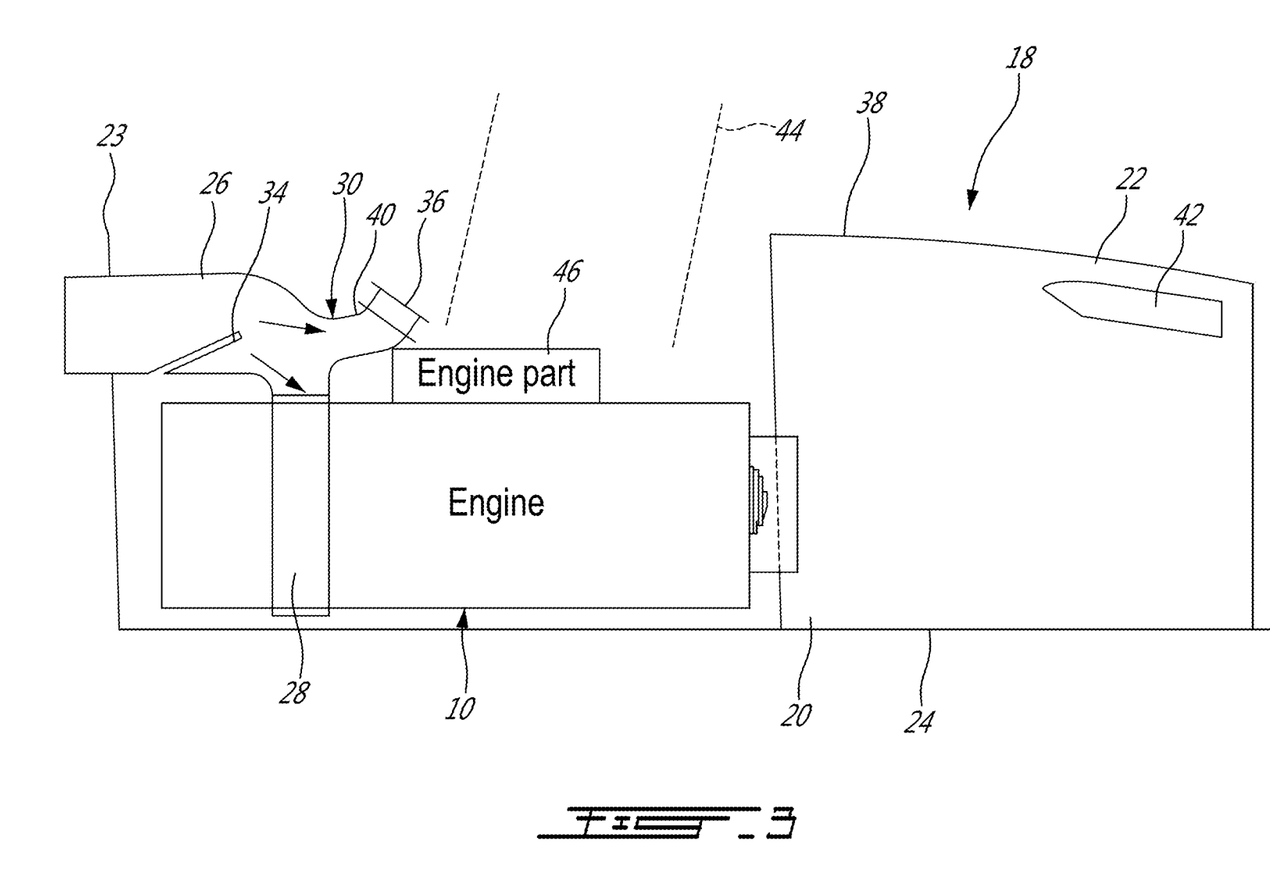
FIG. 3 is a view similar to FIG. 2, with the cowl in a maintenance configuration.

FIG. 3 shows the aircraft 18, and more specifically the cowl 21, in a maintenance configuration, in which the cowl section 22 has been moved to a second position. More specifically, it will be noted that the cowl section 22 has been slid relatively to the engine 10 and to the remainder 23 of the cowl 21, via the sliding connection 24. Moreover, it will also be noted that a first portion 40, or upstream portion, of the bypass duct 30, including the oil cooler 36, remains secured to the inlet duct 26, remainder 23 of the cowl 21, and frame 20, whereas a second portion 42, or downstream portion, of the bypass duct 30 is secured to the cowl section 22 and has moved to the second position with the cowl section 22.

Referring back to FIG. 2, it will be noted that when the cowl section 22 is in the first position, the second portion 42 of the bypass duct 30 which is secured to the cowl section 22, is in fluid flow communication with the first portion 40 and obstructs external access to an engine part 46. Referring to FIG. 3, in the maintenance configuration, the movement of the second portion 42 of the bypass duct 30, and of the cowl section 22 to the second position, opens an access path to the engine 44 to permit external access to the engine part 46. The access path 44 can allow satisfactory access to one or more engine parts 46, for maintenance.

The engine part 46 or parts which is (are) made accessible for maintenance can vary from one embodiment to another, and can include various accessories. The engine part(s) 46 can be one or more of a field control unit, fuel nozzles, a harness attachment, engine cam accessories mounted to a gearbox, and a starter, to name a few examples.

Figure 4:
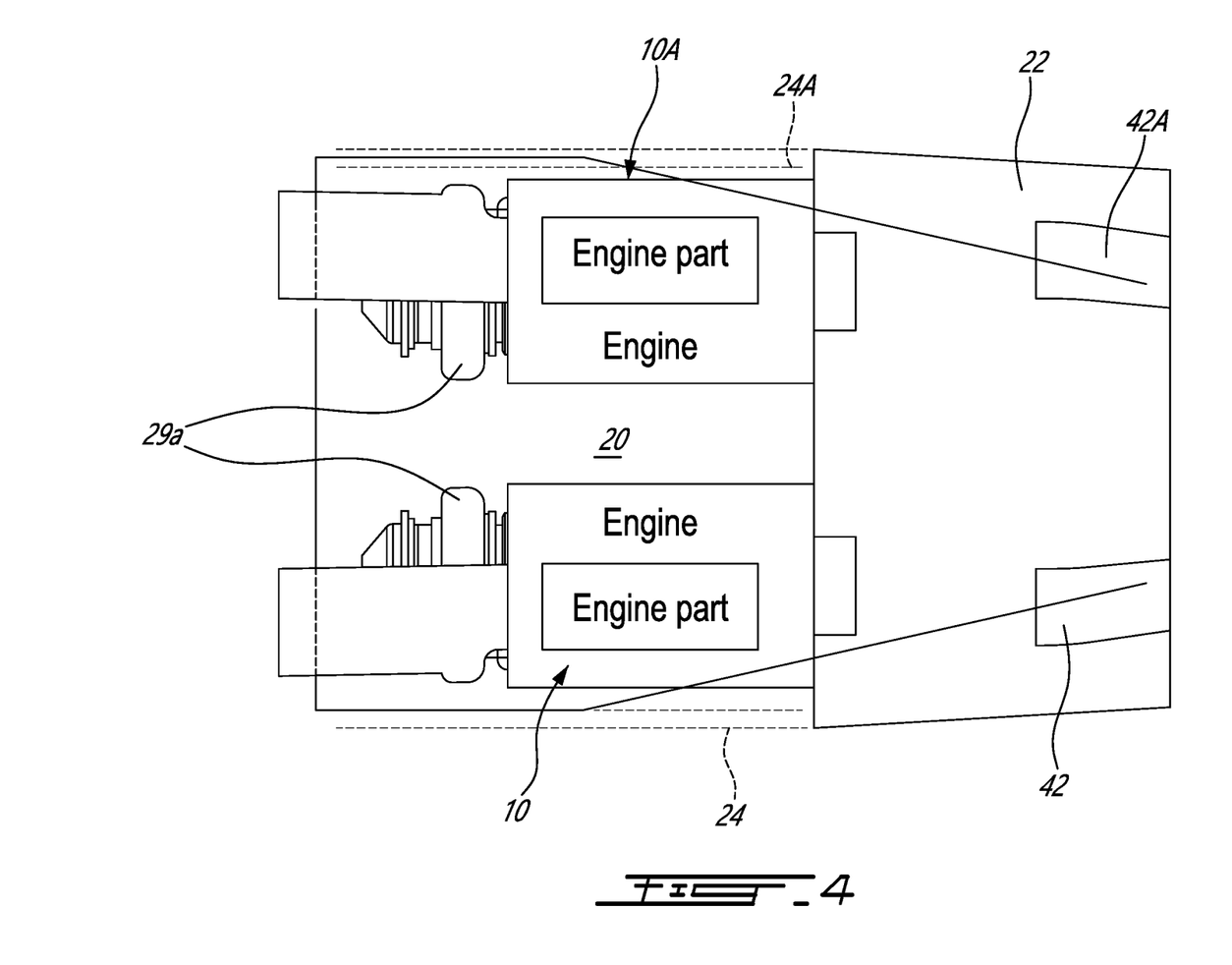
FIG. 4 is top plan view of the aircraft and gas turbine engine of FIG. 3.

Turning now to FIG. 4, which is taken from above, it will be seen that in this specific embodiment, the aircraft actually includes two engines in a side-by-side configuration. Each engine 10, 10A has a corresponding duct portion 42, 42A made integral to the cowl section 22. The cowl section 22 slides along rails 24, 24A and covers the engines 10, 10A during operation of the aircraft.

It will be understood that various features of the embodiment described above are optional. For instance, in the embodiment described above, the duct portion which is made integral to the cowl section is a downstream portion of a bypass duct. In alternate embodiments, the duct portion made integral to the cowl section can be another type of duct than a bypass duct. For instance, the oil cooler can be provided with a dedicated duct (i.e. one which does note branch off from an inlet duct of the engine), and the duct portion which is made integral to the cowl section can be the oil cooler's dedicated duct. In alternate embodiments, duct portions for more than one type of gas path duct can be made integral to the cowl section. Several alternate embodiments will now be described in a manner to assist the reader in understanding the optionality of some of the features present in the first embodiment.

Figure 5:
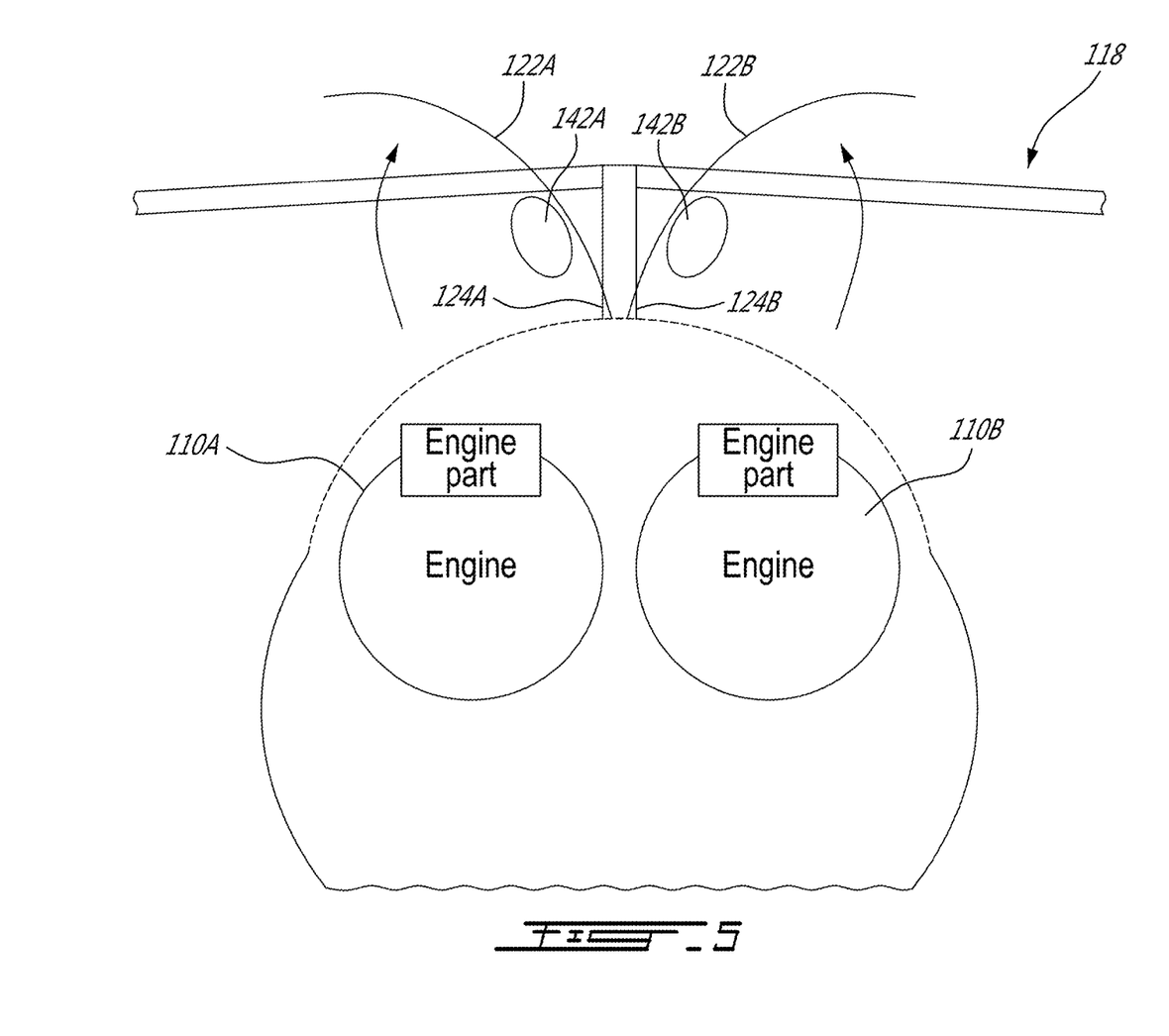
FIG. 5 is a schematic cross-sectional view, taken along a vertical and transversal plane, of an alternate embodiment.

Turning now to FIG. 5, the aircraft 118 is still a helicopter, but instead of having a single cowl section which is slidingly connected to the remainder of the cowl, the cowl section is provided here in the form of two cowl halves 122A, 122B, each hingedly connected to the remainder of the cowl of the aircraft 118 at the center, and being moveable to provide access to a corresponding engine by pivoting around the corresponding hinge connection 124A, 124B. Similarly to the embodiment shown in FIGS. 2 to 4, the embodiment shown in FIG. 5 can have corresponding duct portions 142A, 142B made integral to corresponding cowl sections 122A, 122B, which hingedly move with the corresponding cowl section 122A, 122B to free an access path to one or more engine parts when the cowl section 122A, 122B is moved to the maintenance configuration. In FIG. 5, the maintenance configuration is shown in solid lines, and the operation configuration is schematically shown in dashed lines. The cowl sections 122A, 122B can be referred to as cowl doors.

Figure 6A:
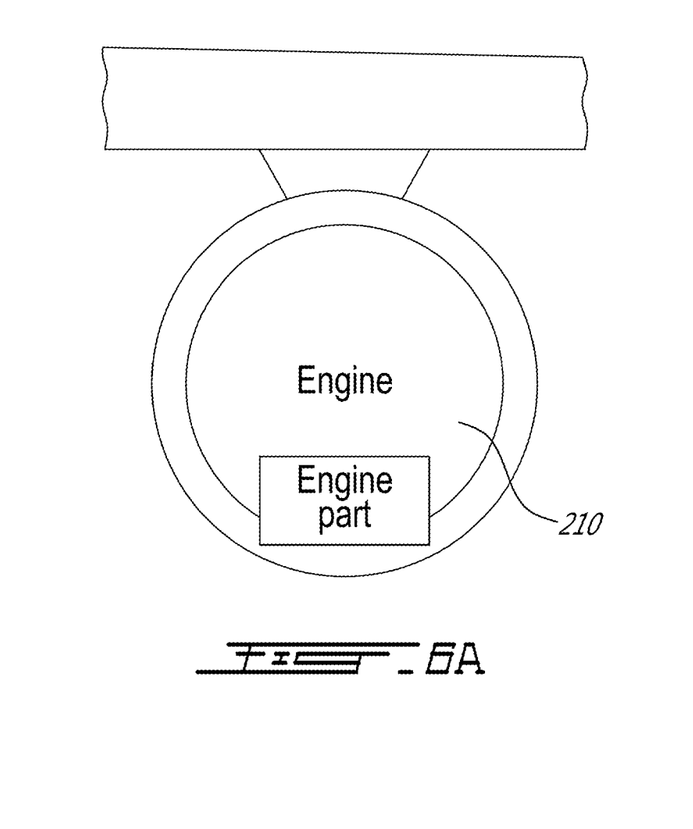
FIGS. 6A and 6B is a schematic cross-sectional view, taken along a vertical and transversal plane, of an alternate embodiment, with FIG. 6A showing the cowl in an operating configuration, and FIG. 6B showing the cowl in a maintenance configuration.
Figure 6B:
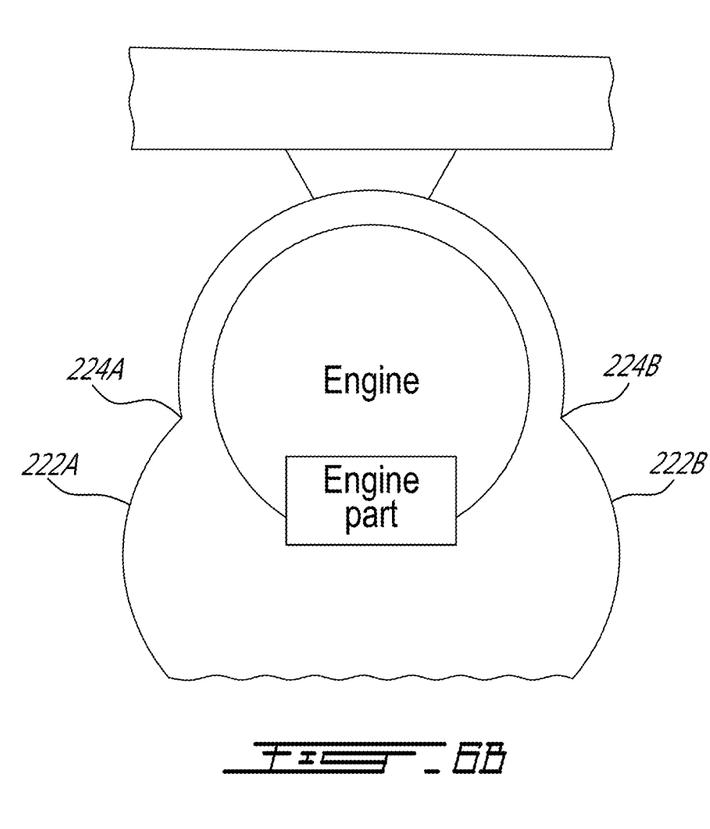

In the embodiment shown in FIGS. 6A and 6B, the cowl sections 222A and 222B are also mounted to a frame via a hinged connection 224A, 224B, but this hinged connection is provided laterally rather than centrally. During maintenance, the cowl sections 222A, 222B can be pivoted around the hinged connections 224A 224B to provide access to the engine 210. In this embodiment, the aircraft engine can be a turboprop engine for instance, and the aircraft can be an airplane.

It will be noted that the engine is typically manufactured by engine manufacturers, whereas the aircraft frame is provided by the aircraft manufacturers, sometimes referred to as airframers. The specifications for duct portions which are made integral to moveable cowl sections can be provided by the engine manufacturer to the airframer, which can provide the gas path duct as part of the aircraft.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft comprising an aircraft engine and a cowl, the aircraft engine having:
    an engine part disposed within the cowl, the cowl having a cowl section movable relative to a remainder of the cowl;
    an inlet duct secured to the remainder of the cowl and leading to an inlet of the aircraft engine:
    an exhaust; and
    bypass duct internal to the cowl and branching off the inlet duct and leading to the exhaust, the bypass duct having a first portion and a cooperating second portion, the second portion mounted to the cowl section, the cowl section movable between a first position in which the first portion and the second portion of the bypass duct are in fluid flow communication with one another and a second position in which the cowl section and the second portion of the bypass duct are moved away from the first portion,
    wherein in the first position the second portion of the bypass duct obstructs external access to the engine part and in the second position the second portion of the bypass duct is displaced to permit external access to the engine part.

2. The aircraft of claim 1 wherein the cowl section and the remainder of the cowl are connected to one another via a sliding connection, the cowl section being slidingly movable relative to the remainder of the cowl, between the first position and the second position, via the sliding connection.

3. The aircraft of claim 1 wherein the aircraft is a helicopter, the aircraft engine is a turboshaft engine.

4. The aircraft of claim 1 wherein the first portion of the bypass duct comprises an upstream portion of the bypass duct and an oil cooler positioned across the upstream portion of the bypass duct.

5. The aircraft of claim 1 wherein the inlet is a quasi scroll inlet, and the inlet duct has a deflector screen upstream of the quasi scroll inlet, the quasi scroll inlet having a duct extending circumferentially around a portion of the aircraft engine, the duct communicating with the aircraft engine.

6. The aircraft of claim 1 wherein the cowl section and the remainder of the cowl are connected to one another via a hinged connection, the cowl section being hingedly movable relative to the remainder of the cowl, between the first position and the second position, via the hinged connection.

7. The aircraft of claim 1 further comprising a second aircraft engine, both the first aircraft engine and the second aircraft engine being internal to the cowl.

8. The aircraft of claim 1 wherein the engine part includes at least one of a field control unit, fuel nozzles, a harness attachment, engine cam accessories mounted to a gearbox, and a starter.

9. The aircraft of claim 1 wherein the first portion of the bypass duct comprises an oil cooler.

10. An aircraft comprising a cowl, the cowl having:
a cowl section movably mounted to a remainder of the cowl between a first position and a second position;
an inlet duct secured to the remainder of the cowl; and
a bypass duct branching off the inlet duct and leading to an exhaust section, the bypass duct being internal to the cowl and having a first portion and a cooperating second portion, the second portion mounted to the cowl section, the cowl section movable between a first position in which the first portion and the second portion of the bypass duct are in fluid flow communication with one another and a second position in which the cowl section and the second portion of the bypass duct are moved away from the first portion.

11. The aircraft of claim 10 wherein the cowl section and the remainder of the cowl are connected to one another via a sliding connection, the cowl section being slidingly movable relative to the remainder of the cowl, between the first position and the second position, via the sliding connection.

12. The aircraft of claim 10 wherein the aircraft is a helicopter.

13. The aircraft of claim 10 wherein the first portion of the duct comprises an upstream portion of the bypass duct and an oil cooler positioned across the upstream portion of the bypass duct.

14. The aircraft of claim 10 wherein the inlet duct has a deflector screen upstream of the bypass duct.

15. The aircraft of claim 10 wherein the cowl section and the remainder of the cowl are connected to one another via a hinged connection, the cowl section being hingedly movable relative to the remainder of the cowl, between the first position and the second position, via the hinged connection.

16. The aircraft of claim 10 wherein the first portion of the duct comprises an oil cooler.

17. A cowl section for an aircraft, the cowl section having an attachment for movably mounting the cowl section to a remainder of a cowl of the aircraft, the cowl section having a portion of a bypass duct portion secured thereto, the portion of the bypass duct selectively fluidly connectable to a remainder of the bypass duct with movements of the cowl section relative to the remainder of the cowl.

* * * * *